United States Patent [19]
Walther

[11] Patent Number: 5,905,097
[45] Date of Patent: May 18, 1999

[54] HIGH-STRENGTH BREATHABLE FILMS OF BLOCK COPOLYMER LATTICES

[75] Inventor: Brian W. Walther, Baton Rouge, La.

[73] Assignee: The Dow Chemical Company, Midland, Mich.

[21] Appl. No.: 08/713,974

[22] Filed: Sep. 12, 1996

Related U.S. Application Data

[63] Continuation-in-part of application No. 08/469,184, Jun. 5, 1995, Pat. No. 5,578,674, which is a continuation-in-part of application No. 08/170,625, Dec. 20, 1993, abandoned, which is a continuation-in-part of application No. 08/002,433, Jan. 8, 1993, abandoned, which is a continuation-in-part of application No. 08/339,682, Nov. 15, 1994, Pat. No. 5,567,760.

[51] Int. Cl.$^6$ ............................... C08L 9/00; C08J 9/00
[52] U.S. Cl. ......................... 521/82; 521/78; 521/139; 521/140; 524/505; 524/575; 525/98
[58] Field of Search ........................ 521/139, 140, 521/78, 82; 524/505, 575; 525/98

[56] References Cited

U.S. PATENT DOCUMENTS

| | | | |
|---|---|---|---|
| 3,238,173 | 3/1966 | Bailey et al. | 524/505 |
| 3,265,765 | 8/1966 | Holden et al. | 521/139 |
| 3,360,599 | 12/1967 | Nyberg et al. | 264/216 |
| 3,485,787 | 12/1969 | Haefele et al. | 524/572 |
| 3,719,572 | 3/1973 | Burke | 524/458 |
| 3,726,824 | 4/1973 | Saunders et al. | 524/534 |
| 4,006,116 | 2/1977 | Dominguez | 524/484 |
| 4,199,490 | 4/1980 | Kamiya et al. | 524/505 |
| 4,358,403 | 11/1982 | Distler et al. | 524/745 |
| 4,386,125 | 5/1983 | Shiraki et al. | 525/314 |
| 4,898,914 | 2/1990 | Gergen | 525/314 |
| 4,970,259 | 11/1990 | Mitchell et al. | 524/505 |
| 5,068,138 | 11/1991 | Mitchell et al. | 524/505 |
| 5,120,765 | 6/1992 | Southwick et al. | 524/505 |
| 5,141,986 | 8/1992 | Southwick et al. | 524/505 |
| 5,236,624 | 8/1993 | Lepert et al. | 524/832 |
| 5,336,712 | 8/1994 | Austgen, Jr. et al. | 524/530 |
| 5,342,858 | 8/1994 | Litchholt et al. | 521/140 |
| 5,567,760 | 10/1996 | Waether et al. | 524/575 |
| 5,578,674 | 11/1996 | Speth et al. | 524/505 |

FOREIGN PATENT DOCUMENTS

| | | |
|---|---|---|
| 0058952 | 9/1982 | European Pat. Off. |
| 0171225 | 12/1986 | European Pat. Off. |
| 0224389 | 3/1987 | European Pat. Off. |
| 0304124 | 2/1989 | European Pat. Off. |
| 0541174 | 12/1993 | European Pat. Off. |
| 541174A1 | 12/1993 | European Pat. Off. |
| 2015249 | 10/1970 | Germany. |
| 1264741 | 2/1972 | United Kingdom. |
| WO 94/15997 | 7/1991 | WIPO. |
| 9420574 | 9/1994 | WIPO. |
| WO 9608266A1 | 3/1996 | WIPO. |
| WO 9615189 | 5/1996 | WIPO. |

OTHER PUBLICATIONS

Chemical Abstracts CA77:89674H.
Derwent Number 77–51183Y, Derwent Publications Ltd., London GB.
*Block Polymers,* "Preceedings of the Symposium on Block Polymers at the Meetings of the American Chemical Society in New York City in Sep. 1969," Plenum Press, New York, 1970, pp. 79–103.
"Encylopedia of Polymer Science and Engineering", vol. 2, John Wiley & Sons, New York, NY/USA 1985, pp. 91–99.

*Primary Examiner*—James J. Seidleck
*Assistant Examiner*—Olga Asinovsky
*Attorney, Agent, or Firm*—Stanley K. Hill; Norman L. Sims

[57] ABSTRACT

The invention is a film having a discontinuous phase of open and closed cells and a continuous organic phase comprising:

(a) one or more block copolymer(s) corresponding to the Formula I:

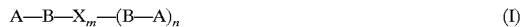

$$A-B-X_m-(B-A)_n \qquad (I)$$

wherein each A is a polymer block derived comprising one or more monovinylidene aromatic monomers, each B is a polymer block derived from one or more conjugated dienes, X is the remnant of a multifunctional coupling agent, m is 0 or 1, and n is an integer from 1 to 5, each A polymer block has a weight average molecular weight from 4,000 to 20,000 Daltons, each B polymer block has a weight average molecular weight from 20,000 to 100,000 Daltons, wherein the block copolymers are optionally hydrogenated; and (b) optionally, an extender which is compatible with the B polymer block, and wherein the organic phase contains from about 5 to about 30 percent by weight of units derived from monovinylidene aromatic monomers and the effective phase volume of the A polymer block in the organic phase is from about 5 to about 20 percent.

Also claimed is a process for the preparation of such articles.

13 Claims, No Drawings

HIGH-STRENGTH BREATHABLE FILMS OF BLOCK COPOLYMER LATTICES

CROSS-REFERENCE TO RELATED APPLICATIONS

This application is a Continuation-in-Part of application Ser. No. 469,184, filed Jun. 5, 1995 U.S. Pat. No. 5,578,674 which is a Continuation-in-Part of Ser. No. 170,625, filed Dec. 20, 1993, now abandoned, which is a Continuation-in-Part application of application Ser. No. 002,433, filed Jan. 8, 1993, now abandoned (all incorporated herein by reference). This application is a Continuation-in-Part of application Ser. No. 339,862, filed Nov. 15, 1994 U.S. Pat. No. 5,567,760 (incorporated herein by reference).

BACKGROUND OF THE INVENTION

The present invention relates to high-strength open cell films prepared from aqueous dispersions of block copolymers of vinyl aromatic monomers and conjugated dienes, wherein the conjugated diene block may optionally be hydrogenated. The invention also relates to a process for the preparation of such high strength open cell films.

High strength solid films prepared from dispersions of block copolymers of vinyl aromatic monomers and conjugated dienes, wherein the conjugated diene block may optionally be hydrogenated, are disclosed in commonly assigned patent applications, WO 94/15997 (equivalent to Ser. No. 170,625, filed Dec. 20, 1993) and WO 96-15189 (equivalent to co pending application Ser. No. 339,862, filed Nov. 15, 1994). The disclosed films are monolithic and are not suitable for applications wherein the rapid transport of gas or moisture through the film is required.

Accordingly, there remains a need to provide films prepared from aqueous dispersions of block copolymers having high strength properties and the ability to rapidly transport gas or moisture through the film. In addition, it would be desirable to provide a process capable of preparing strong open cell films having the ability to rapidly transport gas or moisture through the film from aqueous lattices of block copolymers that use relatively short times and mild temperature conditions for the annealing step to thereby avoid significant polymer degradation. It would be desirable to provide a process for the preparation of thin elastomeric articles having the ability to rapidly transport gas or moisture by film deposition from a block copolymer latex that avoids the use of additives. What is needed, are stable aqueous dispersions of block copolymers which form good films by deposition, wherein the films anneal rapidly at moderate temperatures and demonstrate high tensile strengths and rapid transport of gas and moisture. For many uses, thin elastomeric films must demonstrate resistance to degradation by ozone. What is needed are stable aqueous dispersions of block copolymers which form ozone-resistant films, and such ozone-resistant films.

SUMMARY OF THE INVENTION

Accordingly, the present invention comprises a film having a discontinuous phase of open and closed cells and a continuous organic phase comprising:

(a) one or more block copolymer(s) corresponding to Formula I:

$$A\text{—}B\text{—}X_m(B\text{—}A)_n \quad (I)$$

wherein each A is a polymer block derived from one or more monovinylidene aromatic monomers, each B is a polymer block derived from one or more conjugated dienes, X is the remnant of a multifunctional coupling agent, m is 0 or 1, and n is an integer from 1 to 5, each A polymer block has a weight average molecular weight from 4,000 to 20,000 Daltons, each B polymer block has a weight average molecular weight from 20,000 to 100,000 Daltons, wherein the block copolymers are optionally hydrogenated such that a portion of the residual olefinic unsaturation derived from the conjugated dienes is eliminated and the hydrogenated conjugated diene portion contains sufficient branching such that the block copolymer is elastomeric; and (b) optionally, an extender which is compatible with the B polymer block, wherein the organic phase contains from about 5 to about 30 percent by weight of units derived from monovinylidene aromatic monomers and the effective phase volume of the A polymer block in the organic phase is from about 5 to about 20 percent.

In another embodiment, the invention is a process for preparing a film having a continuous organic phase and a discontinuous phase of open and closed cells which process comprises:

(1) forming an aqueous dispersion which comprises an organic phase as described hereinbefore, a surfactant in sufficient amount to emulsify the organic phase in water; and water, (2) frothing the dispersion such that gas bubbles are entrained throughout the dispersion;

(3) depositing a coating of the frothed aqueous dispersion on a surface and drying the coating to form a film, (4) annealing the film at about 30° C. to about 120° C. for 1 to 60 minutes; and (5) removing the film from the surface.

Such block copolymers readily form thin films, having open and closed cells, by deposition onto solid surfaces from an aqueous dispersion. Such films may be dried to form film articles having open and closed cells therein, high annealed strength properties using short annealing times and mild annealing temperatures and good gas and vapor transmission properties. Examples of such articles include breathable gloves, soft wound dressings and other thin elastomeric articles. If a tackifier and, optionally, other formulants known to one skilled in the art are combined with the block copolymer, films having adhesive properties may also be prepared. Such films may be deposited onto a thin, flexible substrate for use as pressure sensitive tapes, packaging tapes, masking tapes, labels, etc.

DETAILED DESCRIPTION OF THE INVENTION

The films of the invention contain open and closed cells as a discontinuous phase in the continuous organic phase. These cells are in essence voids in the polymer film. The size and relative volume percentage of the cells is dependent on the processing techniques used and can be controlled by the choice of processing techniques. The size and volume percentage of the cells can be any size or volume, provided the organic phase is the continuous phase and the desired gas or vapor transmission and strength properties are achieved. Preferably, the average cross-section of the cells is about 0.01 mm or greater, more preferably, about 0.05 mm or greater and most preferably, about 0.1 mm or greater. Preferably, the average cross-section of the cells is about 20 mm or less, more preferably, about 10 mm or less and most preferably, about 5 mm or less. Preferably, the volume percentage of the cells is about 20 percent or greater of the total film or article, more preferably, about 30 percent or greater and most preferably, about 40 percent or greater. Preferably, the volume percentage of the cells is about 80 percent or less of the total film or article, more preferably, about 70 percent or less and most preferably, about 60 percent or less. Preferably, the films of the invention have a density of about 0.2 g/cc or greater, more preferably, about 0.3 g/cc or greater and most preferably, about 0.4 g/cc or greater. Preferably, the films of the invention have a density of about 3 g/cc or less, more preferably, about 2 g/cc or less and most preferably, about 1.5 g/cc or less. Typically, the cells are filled with air or the gas which is used to create the cells during the frothing process. Examples of such gases includes carbon dioxide, nitrogen, argon, air, and the like.

It has been discovered that by careful selection of the block copolymer and the total volume of the monovinylidene aromatic monomer phase, stable aqueous dispersions can be prepared which form strong free-standing films having open and closed cells therein upon drying at relatively low temperatures. In selecting appropriate block copolymers, the weight average molecular weight of the monovinylidene aromatic monomer block must be within the limits defined herein. If the chain length is too high, the annealing time required to form a high-strength film becomes unacceptably long. If the endblock length is too low, the films prepared do not exhibit acceptable tensile strengths. The total volume of the monovinylidene aromatic monomer (A block) in the organic phase is important in that, if the volume of the monovinylidene aromatic monomer phase is too high, stable dispersions cannot be formed using a relatively low amount of surfactants. If the A block phase volume is too low, the films prepared from the block copolymers will not exhibit the required tensile strengths.

Both linear and radial block copolymers are suitably employed in the invention. Most preferably, however, the block copolymers are sequentially polymerized triblock copolymers, i.e., in Formula (I), n is equal to 1, and m is equal to 0.

The conjugated diene portion of the block copolymer may be optionally hydrogenated to remove the residual unsaturation. The conjugated diene may be partially or fully hydrogenated. Preferably, a significant portion of the olefinic unsaturation is eliminated by hydrogenation while a significant portion of the aromatic unsaturation derived from the monovinylidene aromatic monomers is retained. More preferably, about 99 mole percent or greater of the olefinic unsaturation is eliminated by hydrogenation. More preferably, about 90 mole percent or greater of the aromatic unsaturation is retained. Even more preferably, about 95 mole percent or greater of the aromatic unsaturation is retained, and most preferably, about 99 mole percent or greater of the aromatic unsaturation is retained.

In hydrogenated block copolymers the diene block must have sufficient branching to prevent formation of crystalline domains to retain the elastomeric properties of the block copolymer. As used herein, "branching" means after polymerization, lower alkyl or alkenyl substituents are pendant from the conjugated diene portion of the block copolymer. For example, if isoprene is used to prepare the desired diene block, methyl groups are pendant from the chain. Where a straight-chain conjugated diene, such as butadiene, is used there must be a sufficient amount of 1,2-addition to prevent formation of crystalline domains. 1,2-addition results when the polymerization occurs through one olefinic bond rather than through both olefinic bonds. When polymerization occurs through one olefinic bond, an unsaturated group is pendant from the polymer chain. Where a straight-chain conjugated diene is used, the 1,2-addition is preferably, about 25 mole percent or greater, more preferably, about 30 mole percent or greater and most preferably, about 35 mole percent or greater. If too much branching is present, the resultant polymer is no longer elastomeric. Preferably, the 1,2-addition is about 60 percent or less and more preferably, about 50 percent or less. The amount of 1,2-addition for butadiene can be increased by the use of a polar co-solvent in the polymerization. Preferably, only a portion of the solvent used is polar. A preferred co-solvent for this purpose is tetrahydrofuran. "Derived from monomers," as used herein, means that the polymer block(s) referred to comprise the residue of the monomers referred to in the polymer block. Residue refers to the portion of the monomer which remains in the polymer block after polymerization.

Preferred monovinylidene aromatic and conjugated diene monomers useful herein are disclosed in co pending application Ser. No. 469,184 filed, Jun. 5, 1995, at page 6, lines 26 to 35 and commonly assigned WO 94/15997 at page 3, lines 31 to 36, published Jul. 21, 1994 (relevant portions incorporated herein by reference). Preferably, the amount of monovinylidene aromatic monomer in the organic phase is about 5 percent by weight or greater, more preferably, about 6 percent by weight or greater and most preferably, about 10 percent by weight or greater. Preferably, the amount of monovinylidene aromatic monomer in the organic phase is about 30 percent by weight or less, more preferably, about 25 percent by weight or less and most preferably, about 20 percent by weight or less. Preferably, the monovinylidene aromatic monomer block has a weight average molecular weight of about 4,000 Daltons or more, more preferably, about 5,000 Daltons or more, and most preferably, about 8,000 Daltons or more. Preferably, the monovinylidene aromatic monomer block has a weight average molecular weight of about 20,000 Daltons or less and more preferably, about 15,000 Daltons or less. Preferably, each conjugated diene block (B) has a weight average molecular weight of about 15,000 Daltons or greater, more preferably about 20,000 Daltons or greater, even more preferably, about 25,000 Daltons or greater, most preferably, about 40,000 Daltons. Preferably, each B block has a weight average molecular weight of about 100,000 Daltons or less, even more preferably, about 80,000 Daltons or less and most preferably, about 70,000 Daltons or less. Preferably, the monovinylidene aromatic polymer block has an effective phase volume in the organic phase of about 5 volume percent or greater, more preferably, about 8 volume percent or greater, even more preferably, about 10 volume percent or greater, and even more preferably, about 12 volume percent or greater. Preferably, the monovinylidene aromatic polymer block has an effective phase volume in the organic phase of about 20 volume percent or less, more preferably, about 19 volume percent or less, even more preferably, about 18.5 volume percent or less and most preferably, about 18 volume percent or less. "Organic phase" as used herein, refers to all of the organic-based materials in the dispersion, except the surfactant. Such materials include the block copolymers and any optional extender.

A blend of two or more block copolymers may be used in this invention. All of the block copolymers used, preferably have A blocks which have weight average molecular weights in the range of from, about 4,000 to about 15,000 Daltons. The composition weighted average monovinylidene aromatic monomer content of the blended copolymers is preferably from, about 5 to about 30 percent by weight. One or more of the components may have a monovinylidene aromatic monomer content outside of the stated range, provided the average is within the stated range. In the embodiment, wherein one of the block copolymers in such a blend has a monovinylidene aromatic monomer content above about 25 weight percent, it is preferred that the monovinylidene aromatic monomer content be about 35 weight percent or less and, more preferably, about 30 weight percent or less. Preferably, the total amount of block copolymer having a monovinylidene aromatic monomer content above about 25 percent by weight is about 35 percent by weight or less and, more preferably, about 30 percent by weight or less. The block copolymers can be blended in bulk and thereafter emulsified. Optionally, the block copolymers may be emulsified separately and the dispersions can be blended. Methods of blending the bulk block copolymers or aqueous dispersions of the block copolymers are well known in the art.

In some embodiments of the invention, one or more block copolymers may have an effective phase volume of the A block which is greater than preferred. In order to reduce the phase volume of the A block, an extender may be blended with the block copolymer to reduce the effective phase volume of the A block in the organic phase to the required or desired level. Extenders useful in the invention are non-volatile organic materials which have a greater affinity for the B block than the A block, that is, such extenders are soluble in the B block or form a single phase with the B block when the extender is mixed with one or more block copolymers. Among preferred extenders are hydrocarbon oils, polymers or oligomers derived from monomers having olefinic unsaturation compatible with the B block, or mixtures thereof. More preferred extenders are the aliphatic hydrocarbon and naphthenic oils, with the most preferred class of extender oils being the aliphatic hydrocarbon oils. The preferred hydrocarbon oils are selected according to the ultimate end use and the cost of such oils. Among preferred oils are Tufflo™ 6056 mineral oil (a trademark of Atlantic Richfield Company) and Shellflex™ 371 mineral oil (a trademark of Shell Oil Company). The preferred polymers useful as extenders include polyisoprene, polybutadiene, polyisobutylene, polyoctene, polyethylene vinyl acetate, polyethylene methacrylate, ethylene-propylene diene monomer-based polymers, styrene-butadiene random copolymers, low density polyolefins and ethylene-styrene copolymers. Most preferred polymers include polyisoprene and polybutadiene. The extenders are present in a sufficient amount to achieve the desired effective phase volume of the A block. If too much extender is used, the films prepared from the aqueous dispersions would not meet the tensile strengths required. The amount of extender is preferably about 45 percent by weight or less of the organic phase, more preferably, about 40 percent by weight or less and most preferably, about 30 percent by weight or less. If present, the extender is present in an amount of about 1 percent by weight or greater of the organic phase and more preferably, about 5 percent by weight or greater.

The extender oils can be blended with the block copolymer in bulk and the blend can be emulsified. Alternatively, the extender oils and block copolymers can be separately emulsified and the dispersions can be blended to achieve the desired organic phase composition. In yet another embodiment, the extender may be added directly to a dispersion of the block copolymers. Methods of performing such blending are well known in the art. In the embodiment where the extender is a polymer, the polymer is either blended into a solution of block copolymer in organic solvent or into a dispersion of the block copolymer. Preferably, the extender is in the form of an organic solution or dispersion when blended with the block copolymer.

To achieve the required organic phase composition, a blend of two or more copolymers and one or more extenders may be used in combination.

The percentage of the monovinylidene aromatic monomer block in the block copolymer or organic phase, measured as a volume percent, is less than the percentage thereof measured by weight. In order to determine the volume percent of the monovinylidene aromatic polymer block, the corresponding weight percentage of monovinylidene aromatic monomer is divided by a correction factor. The correction factor is a value equal to the sum of ratios of each monomer's content in weight percent divided by the respective density of a homopolymer of such monomer. For a two-component block copolymer, this may be expressed as follows in Formula II:

$$\%(vol_a) = \%(wt_a)/D_a/(\%(wt_a)/D_a + \%(wt_b)/D_b) \qquad (II)$$

where: $\%(vol_a)$ is the effective phase volume in percent for the monovinylidene aromatic polymer block;

$\%(wt_a)$ and $\%(wt_b)$ are the respective weight percent contents of monovinylidene aromatic monomer and diene monomer in the block copolymer; and $D_a$ and $D_b$ are the respective densities of homopolymers, the monovinylidene aromatic monomer and diene monomer.

In those embodiments where an extender is present, the effective phase volume of the A block in the organic phase is represented by Formula III:

$$\%(vol_a) = \%(wt_a)/D_a/(\%(wt_a)/D_a + \%(wt_b)/D_b + \%(wt_d)/D_d) \qquad (III)$$

where: $\%(wt_d)$ is the weight percent of the extender present, $D_d$ is the density of the extender present; and the other terms are defined above.

At lower monovinylidene aromatic monomer effective phase volumes, especially for polymers wherein the monovinylidene aromatic monomer block molecular weight is relatively low, the tensile properties of the resulting films are unacceptably low. At higher monovinylidene aromatic monomer effective phase volumes, the dispersion does not readily form films, especially at mild temperatures from about 25° C. to about 90° C. Moreover, films from such polymers require longer periods of time under annealing conditions and/or higher annealing temperatures to achieve maximum tensile strength properties. Such films are subject to polymer degradation resulting in films possessing poor tensile properties, especially ultimate tensile strength.

Preferably, the weight average molecular weight ($M_w$) of the triblock copolymers is about 38,000 Daltons or greater, more preferably, about 60,000 Daltons or greater, even more preferably, about 76,000 Daltons or greater and even more preferably, about 96,000 Daltons or greater, and most preferably, about 110,000 Daltons or more. Preferably, the weight average molecular weight ($M_w$) of the triblock copolymers is about 430,000 Daltons or less, more preferably, about 240,000 Daltons or less and most preferably, about 200,000 Daltons or less. In the embodiment where the block copolymer is a radial block copolymer, the weight average molecular weight is preferably, about 500,000 Daltons or less, more preferably, about 400,000 Daltons or less, even more preferably, about 300,000 Daltons or less, most preferably, about 230,000 Daltons or less. Molecular weights are determined by size-exclusion chromatography. Commercially available polystyrene standards are used for calibration and the molecular weights of copolymers corrected according to Runyon et al.,

*J. Applied Polymer Science*, Vol. 13, p. 2359 (1969) and Tung, L. H., *J. Applied Polymer Science*, Vol. 24, p. 953 (1979).

Preferably, the B block of the block copolymers employed herein comprises a high 1,4-content polymer of a conjugated diene. By this, is meant, that the vinyl functionality of the resulting conjugated diene polymer block is preferably below about 10 weight percent for blocks not containing butadiene or, in the case of blocks comprising butadiene, preferably below about 25 weight percent.

It is believed (but not agreeing to be bound by such belief) that when the monovinylidene aromatic polymer blocks possess the previously stated effective phase volume, the monovinylidene aromatic polymer blocks coalesce, thereby causing the polymer matrix to possess a particulated or spherical morphology instead of a cylindrical or lamellar morphology. Such morphology is desirable for the formation of films from dispersions having good strength properties and film formation rates. Such morphology, as well as the concept of polymer block phase volume, are disclosed in S. L. Aggarwal, *Block Polymers*, Plenum Press, pp. 102–103 (1970). It is further believed (but not agreeing to be bound by such belief) that the particulated or spherical morphology which is present in the A block is the discontinuous phase which facilitates the formation of stable dispersions and strong films.

Block copolymers and techniques for their preparation are well known in the art as disclosed in Ser. No. 469,184 filed Jun. 5, 1995, at page 14, line 14 to page 15, line 22; WO 94/15997 at page 7, line 11 to line 34; and U.S. Pat. No. 4,196,154, the teachings of which are incorporated herein by reference.

Surfactants and preferred surfactants useful in the invention are those which emulsify the block copolymer(s) and optional extender in water and are disclosed in Ser. No. 469,184 filed Jun. 5, 1995, at page 15, line 24 to page 16, line 8; and WO 94/15997 at page 7, line 35 to page 8, line 10. Preferably, the surfactants have an HLB (hydrophobic, lypophobic balance) of about 15 or greater and, more preferably, an HLB of about 18 or greater.

The surfactant is present in a sufficient amount to emulsify the block copolymer(s) and optional extender(s). If too much surfactant is used to prepare the aqueous dispersions, the surfactant will negatively impact the tensile properties. Preferably, about 0.5 percent by weight or more of surfactant is present and more preferably, 1 percent by weight or more is present. Preferably, about 10 percent by weight or less surfactant is used, more preferably, about 8 percent by weight is used and even more preferably, about 6 percent by weight or less is used.

To produce an aqueous dispersion (interchangeably referred to herein as a dispersion or a latex) the polymer, usually in the form of a solution in an organic solvent, is dispersed in water using a suitable surfactant and the organic solvent is removed. One suitable procedure is disclosed in U.S. Pat. No. 3,238,173 (incorporated herein by reference). Emulsification can take place by any of the well-known means for this purpose and the specific means utilized does not form an essential aspect of the present invention. In one embodiment, the block copolymer and optional extender are dissolved in an organic solvent. In such embodiment, a portion of the solvent is removed until the solids level is preferably, about 30 percent by weight or greater and, more preferably, about 40 percent by weight or greater. Preferably, the solids content is as high as possible. The upper limit is a practical one, in that the solution must be processable. Thereafter, the block copolymer and optional extender are contacted with water and surfactant with agitation to emulsify the mixture. Thereafter, the remaining solvent is removed by conventional means, such as rotary evaporation or vacuum distillation. Preferably, the solids level is about 20 percent by weight or greater and more preferably, about 28 percent by weight or greater. Preferably, the solids level is about 75 percent by weight or less, more preferably, about 70 percent by weight or less, even more preferably, about 65 percent by weight or less and most preferably, about 60 percent by weight or less. Generally, the number average size of the resulting latex particles is less than about 5.0 microns and more preferably, from about 0.3 to about 2.0 microns. Preferably, the latex particles (the dispersed polymer particles in the aqueous medium) are spherical in shape.

The dispersion is frothed by any means which introduces bubbles into the emulsion to thereby entrain gas in the emulsion. Such means include agitating the emulsion or by bubbling a gas through the emulsion such that the emulsion froths. In the embodiment where agitation is used, any means of agitation which introduces bubbles into the emulsion is suitable. In one preferred embodiment, the agitation is performed by the use of an impeller. In this embodiment, the impeller is rotated at a speed so as to introduce bubbles and froth the emulsion. In the embodiment, where a gas is bubbled through the emulsion, the gases which may be used are any which result in the dispersion frothing and which can become entrained in the frothed dispersion, and preferably include air, nitrogen, carbon dioxide, argon and the like.

To prepare a film from the frothed dispersion, a suitable form having a surface in the shape of the desired resulting product (optionally having a surface coating of a suitable substance to promote film removal and/or dispersion deposition as previously known in the art) is coated with the frothed dispersion and the water is thereafter removed by evaporation. A preferred dispersion for use in the manufacture of dipped goods in the foregoing manner contains about 20 percent by weight or greater of solids, more preferably, from about 25 percent by weight or greater and most preferably, about 27 percent by weight or greater. Preferably, the dispersion has a solid content of about 70 weight percent or less and more preferably, about 60 weight percent or less. A second or further layer may be applied in the same manner to achieve thicker films. The film resulting from the foregoing procedure may be dried and annealed, if desired, by any suitable technique, especially by heating. Preferred temperatures for drying and annealing are about 25° C. or greater, more preferably, about 30° C. or greater and most preferably, about 50° C. or greater. Preferably, the temperatures for drying and annealing the films are about 130° C. or less, more preferably, about 120° C. or less and most preferably, about 110° C. or less. Preferred times for drying and annealing are about 1 minute or greater and more preferably, about 4 minutes or greater. Preferred times for drying and annealing are about 10 hours or less, preferably, about 60 minutes or less and more preferably, 30 minutes or less. At higher temperatures, shorter drying and annealing times are required. The drying and annealing steps of the process may be conducted simultaneously or separately. For example, multiple film layers may be deposited and dried before the resulting structure is annealed.

In one preferred embodiment the films can be prepared using the emulsions and processes described in U.S. Pat. No. 5,500,469 (incorporated herein by reference) wherein the emulsions have been frothed as described herein. Thereafter, the frothed emulsion is placed on a hot surface, such as a belt, and the thickness is controlled by a means known to one skilled in the art, such as with an adjustable beam.

Preferably, the surface is heated to a temperature of about 50° C. or greater and more preferably, about 60° C. or greater and preferably about 99° C. or less and more preferably about 90° C. or less.

Preferably, the films or elastomeric articles prepared from block copolymers which have not been hydrogenated to remove at least 99 percent of the residual unsaturation in the conjugated diene block contain an antiozonant which prevents or retards degradation due to ozone attack. Preferably, the films or elastomeric articles which contain an antiozonant do not stain and do not have an unpleasant odor. Preferred antiozonants include dialkyl paraphenylenediamines, acetals and styrene-substituted phenols. Preferred classes are the acetals and styrene substituted phenols. A preferred dialkyl paraphenylenediamine is N,N'-di-(2-octyl)p-phenylenediamine, available from R. T. Vanderbilt under the trademark Antozite™ 1. A preferred acetal is bis-(1,2,3,6-tetrahydrobenzaldehyde)-pentaerythrityl acetal available from Akrochem Corporation, under the trade name 70TBPA. A preferable styrene-substituted phenol is bis-(alphamethylbenzyl) phenol, available under the trademark PRODOX™ 120 from PMC Specialties Group. The antiozonants are used in a sufficient amount to render the films or articles of the invention ozone resistant for a period of 1,000 hours. Ozone resistance is determined according to the following test. Films according to the invention are cut into dumbbell shapes having the gauge dimension of 2.5 in. (6.4 cm) (length) by 0.5 in. (1.3 cm) (width). The samples are stretched to 100 percent elongation and secured to a hard surface at such elongation and exposed to atmospheric ozone. The time from the start of the test until the samples break is the ozone resistance. "Nonstaining" as used herein, means no transference of a noticeable color to white fiberboard during the ozone resistance test. Preferably, the antiozonant is present in an amount of about 0.5 percent by weight or greater, based on the article or film. Preferably, the antiozonant is present in an amount of about 5 percent by weight or less, based on the weight of the film or article. The antiozonant can be blended with the block copolymer or organic phase in bulk, in solution or in the dispersion using techniques well known in the art. Preferably, the antiozonant is dissolved in an organic solvent and contacted with a solution of the block copolymer or organic phase. Preferably, the same solvent is used for the antiozonant as the block copolymer or the organic phase. Preferably, the solids level of the antiozonant is the same as the solids level of the block copolymer or organic phase as this facilitates formation of a homogeneous mixture.

Preferably, the dispersions and films of the invention contain wax to further enhance the ozone resistance. Preferred useful waxes include paraffin or microcrystalline waxes having a melting point of from about 30° C. to about 65° C. Waxes useful in the films and dispersions of the invention include 1230 CP Hall No Chek Wax™ and Mobilcer C Wax™ available from Mobil Oil Corporation. Wax is preferably present in an amount of about 0.5 percent by weight or greater, based on the solids in the dispersion or of the film, more preferably, about 1.0 percent by weight or greater. Wax is preferably present in an amount of about 5.0 percent by weight or less, based on the solids in the dispersion or of the film, more preferably, about 4.5 percent by weight or less.

The film thickness is determined by the ultimate use. The desired film thickness for the uses for which the films of the invention may be used are well known in the art. Preferably, the films have a thickness of about 0.03 mm or greater, more preferably, about 0.13 mm or greater and most preferably, about 0.20 mm or greater. Preferably, the films are about 3.0 mm or less and most preferably, about 2.0 mm or less.

Preferably, the films of this invention are free-standing, which means the films do not require a substrate to retain their integrity.

Films having adhesive properties may be prepared by incorporating a suitable tackifier, usually a low molecular weight organic polymer such as a polyterpene or similar compound, in the film. Tackifying resins useful herein are those known in the art and include hydrogenated rosin esters, esters of polyhydric alcohol, phenol-aldehyde resins and hydrocarbon resins, which includes polyterpenes. U.S. Pat. No. 5,183,705 provides a description of such tackifying resins, relevant portions are incorporated herein by reference. Additional formulants such as oils, may also be added to modify the adhesive properties of the resulting film. Particularly useful oils are hydrocarbon oils, preferably paraffinic and naphthenic oils. U.S. Pat. No. 3,935,338 discloses preferred oils useful in adhesive formulations, relevant parts incorporated herein by reference. Such oils are preferably incorporated in amounts of about 5 to about 20 percent by weight of the final adhesive formulation. The tackifiers and other formulants may be added to the polymer solution or incorporated into the latex. The resulting modified latex may be further concentrated and coated onto a substrate, for example, a sheet or a film, such as a masking tape backing. The substrate/film combination may thereafter be dried and, optionally, annealed to form the final product.

Having described the invention, the following examples are provided as further illustration and are not to be construed as limiting. Unless stated to the contrary, parts and percentages are expressed on a weight basis. Effective phase volumes were calculated using the previously disclosed Formulae (II and III). For such calculations, the densities of the respective polymers used were polystyrene: 1.047, polyisoprene: 0.91 and polybutadiene: 0.90.

EXAMPLE 1

Films of Styrene-Isoprene-Styrene Block Copolymer

An aqueous dispersion was formed from a cyclohexane solution of a styrene-isoprene-styrene triblock copolymer having a total $M_w$ of 140,000 Daltons, and a styrene content of 18 weight percent and 17.5 volume percent (effective phase volume). The surfactant used was Rhodopex Co-436™, available from Rhone Poulenc, sulfated nonylphenoxypoly-(ethyleneoxy) ethanol at a 3 percent by weight level. Molecular weights were determined by gel permeation chromatography using polystyrene standards and corrected for diene content. The polystyrene endblocks had weight average molecular weights of 12,600 Daltons. The total polyisoprene block $M_w$ was 114,800 Daltons. The solvent was removed and the dispersion concentrated to 52 percent solids by weight. To a container filled with this dispersion, a nitrogen purge (15 mL volume/minute) was initiated and allowed to continue for 16 hours. During this time, the dispersion entrained a significant number of air bubbles. When a heated mold was dipped into the dispersion, a uniform breathable film was produced. The foamed material was annealed at 90° C. for 20 minutes in a forced-air oven. When the article was filled with water, no holes were detected. However, once a slight pressure was applied, small water droplets were displaced to the surface. Air could be blown through the film.

EXAMPLE 2

A styrene-isoprene-styrene block copolymer having a $M_w$ of 140,000 Daltons and a styrene weight percentage of 18 percent, 17.5 styrene volume percent, and a styrene block molecular weight of 12,600 Daltons was dispersed in water as described in Example 1 to a percent solids of 42 percent by weight. The surfactant used in the dispersion was Dresinate 731D™ acid form of a modified rosin (available from Hercules), having an average molecular weight of 302 in an amount of 3 parts per hundred parts of block copolymer with an equimolar amount of potassium hydroxide to the dispersion. The pH of the dispersion was adjusted to 10.5. 10 grams of Rhodopex Co-436™ was added to 200 grams of this dispersion and blended in a high shear mixer for 10 minutes. The mixer is an overhead utility blender operated at 10,000 rpm. The mixing caused the latex to expand to 4 times its original volume. The additional volume was due to entrained air. An approximately 15 gram amount was poured on a level glass plate which was at room temperature. The foam was drawn to 40 mils thick using a draw bar. The film was left standing for 2 minutes and then the plate and film were placed in a forced-air oven maintained at 90° C. for 20 minutes. The plate was removed and allowed to cool. The foam produced a breathable film once it was removed from the plate. A second sample was prepared by the same procedure except that the foamed dispersion was drawn across a glass plate preheated to approximately 60° C. After treating the second sample as described above, the foam structures were compared. In the case where the plate was heated, the cell structure appeared to be more open.

EXAMPLE 3

A hydrogenated styrene-butadiene-styrene block copolymer having two styrene chains with an $M_w$ of 11,700 Daltons and a central hydrogenated butadiene chain of 54,000 Daltons available from Shell Chemical Co. under the trademark and designation Kraton™ G 1652, nominally containing 55 parts of oil per hundred parts of block copolymer was dissolved in cyclohexane to form a 36 percent by weight solids solution. The amount of styrene in the organic phase is 19 percent by weight and 18 percent by volume. Dresinate™ 73D surfactant with an equimolar amount 3 parts per hundred of block copolymer of potassium hydroxide was added to the dispersion. The pH was adjusted to about 10.5. Approximately 200 grams of the dispersion was placed into a container and mixed under high shear conditions for 10 minutes. The resulting foam was poured onto a glass plate and drawn down to 25 mils (0.64 mm) thick. The foam was placed into an oven maintained at 100° C. for 20 minutes. After annealing, the foam was removed from the oven, allowed to cool and removed from the glass. The foam was breathable and strong.

EXAMPLE 4

Dispersions of Example 2 were foamed and poured onto a glass plate. Several foams were leveled with bars having differing gaps. After annealing, the foam thicknesses were measured, and the original bar thickness and final film thickness are listed below for the samples. The data demonstrates that films of differing thickness can be prepared.

| Sample | Bar Gap (mil) | Bar Gap (mm) | Thickness (mil) | Thickness (mm) |
|---|---|---|---|---|
| 1 | 50 | 1.25 | 12 | .3 |
| 2 | 30 | .75 | 7 | .18 |
| 3 | 20 | .50 | 5 | .13 |
| 4 | 10 | .25 | 3 | .08 |

EXAMPLE 5

Adhesive Foam

A dispersion of styrene-butadiene radial block copolymer having 21 weight percent styrene, a total weight average molecular weight of 305,000, 4 arms, a styrene block molecular weight of about 16,000 Daltons and a styrene volume percent of 19.5, 3 parts per hundred parts of Dresinate™ 731D surfactant, equimolar amounts of potassium hydroxide, oil and tackifier was prepared as in Example 1 and pH adjusted to 10.5. A foam was prepared as described in Example 2. The foam was tacky yet still breathable. The foam tacked to a metal surface much like a conventional pressure sensitive adhesive.

What is claimed is:

1. An article comprising a film having a discontinuous phase of open and closed cells and a continuous organic phase comprising:

(a) one or more block copolymer(s) corresponding to the Formula I:

$$A—B—X_m—(B—A)_n \qquad (I)$$

wherein each A is a polymer block derived from one or more monovinylidene aromatic monomers, each B is a polymer block derived from one or more conjugated dienes, X is the remnant of a multifunctional coupling agent, m is 0 or 1, and n is an integer from 1 to 5, each A polymer block has a weight average molecular weight from 4,000 to 20,000 Daltons, each B polymer block has a weight average molecular weight from 20,000 to 100,000 Daltons, wherein the block copolymers are optionally hydrogenated such that a portion of the residual olefinic unsaturation derived from the conjugated dienes is eliminated and the hydrogenated conjugated diene block contains sufficient branching such that the block copolymer is elastomeric; and (b) optionally, an extender which is compatible with the B polymer block, wherein the organic phase contains from about 5 to about 30 percent by weight of units derived from monovinylidene aromatic monomers and the effective phase volume of the A polymer block in the organic phase is from about 5 to about 20 percent.

2. An article according to claim 1 wherein the organic phase comprises:

(a) one or more block copolymers, and (b) an extender comprising a naphthenic or aliphatic hydrocarbon oil or a polymer compatible with the B block of the copolymer.

3. An article according to claim 2 wherein the organic phase comprises two or more block copolymers wherein each A polymer block has a weight average molecular weight of from about 4,000 to about 15,000 Daltons.

4. An article according to claim 2 wherein about 99 percent or greater of the olefinic unsaturation of the B block is eliminated by hydrogenation.

5. An article according to claim 2 wherein the surfactant is present in an amount of from about 0.5 to about 10 percent by weight.

6. An article according to claim 2 wherein the block copolymer is derived from styrene and 1,3-butadiene or isoprene.

7. An article according to claim 2 wherein the effective phase volume of the A polymer blocks in the organic phase is from about 10 to about 18 volume percent.

8. An article according to claim 2 wherein the organic phase further comprises an antiozonant selected from the group of dialkyl paraphenylenediamines, acetals and styrene-substituted phenols.

9. An article according to claim 8 wherein the antiozonant is selected from the group of N,N'-di-2-octyl paraphenylenediamine, bis-(1,2,3,6-tetrahydrobenzaldehyde)-pentaerythrityl acetal and bis-(alpha-methylbenzyl)phenol.

10. An article according to claim 9 wherein the organic phase comprises from about 0.5 to about 5 percent by weight of an antiozonant based on the solids in the dispersion.

11. An article according to claim 2 wherein the organic phase comprises two or more block copolymers and a residue of the surfactant wherein the average A block content of the two or more block copolymers is from about 5 to about 25 percent by weight and wherein the monovinylidene aromatic monomer block of each of the two or more block copolymers has a weight average molecular weight of from about 8,000 to about 15,000 Daltons.

12. An article according to claim 1 which further comprises a tackifier.

13. An article according to claim 8 wherein the antiozonant is selected from the group of acetals and styrene substituted phenols.

* * * * *